(12) United States Patent
Lee et al.

(10) Patent No.: US 11,531,308 B2
(45) Date of Patent: Dec. 20, 2022

(54) ADAPTIVELY LEARNING SURROGATE MODEL FOR PREDICTING BUILDING SYSTEM DYNAMICS FROM SIMULATION MODEL

(71) Applicant: Johnson Controls Tyco IP Holdings LLP, Milwaukee, WI (US)

(72) Inventors: Young M. Lee, Old Westbury, NY (US); Zhanhong Jiang, Milwaukee, WI (US); Kirk Drees, Cedarburg, WI (US); Michael Risbeck, Madison, WI (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 332 days.

(21) Appl. No.: 16/726,007

(22) Filed: Dec. 23, 2019

(65) Prior Publication Data
US 2021/0191343 A1    Jun. 24, 2021

(51) Int. Cl.
| | |
|---|---|
| G05B 13/02 | (2006.01) |
| G05B 13/04 | (2006.01) |
| G06N 3/08 | (2006.01) |
| F24F 11/30 | (2018.01) |
| F24F 11/64 | (2018.01) |
| G06N 3/04 | (2006.01) |

(52) U.S. Cl.
CPC .......... G05B 13/027 (2013.01); F24F 11/30 (2018.01); F24F 11/64 (2018.01); G05B 13/042 (2013.01); G05B 13/048 (2013.01); G06N 3/0445 (2013.01); G06N 3/08 (2013.01)

(58) Field of Classification Search
CPC .. G05B 13/027; G05B 13/042; G05B 13/048; G05B 15/02; G05B 2219/25011; F24F 11/30; F24F 11/64; G06N 3/0445; G06N 3/08; G06N 3/0454
See application file for complete search history.

(56) References Cited

U.S. PATENT DOCUMENTS

| | | | | |
|---|---|---|---|---|
| 2012/0065783 A1* | 3/2012 | Fadell | ................. | G05B 13/048 703/7 |
| 2015/0300892 A1* | 10/2015 | Malhotra | ................. | F24F 11/30 702/130 |
| 2016/0371405 A1* | 12/2016 | Raczynski | .............. | G06F 30/20 |
| 2018/0276560 A1* | 9/2018 | Hu | ......................... | G06N 20/00 |
| 2020/0184017 A1* | 6/2020 | Batra | ....................... | G06F 16/95 |
| 2020/0217544 A1* | 7/2020 | Park | ......................... | F24F 11/46 |
| 2021/0190364 A1* | 6/2021 | Lee | ........................... | F24F 11/47 |
| 2021/0191348 A1* | 6/2021 | Lee | ........................... | F24F 11/64 |

* cited by examiner

*Primary Examiner* — Ramesh B Patel
(74) *Attorney, Agent, or Firm* — Foley & Lardner LLP

(57) ABSTRACT

Systems and methods for training a surrogate model for predicting system states for a building management system based on generated data from a simulation model are disclosed herein. The simulation model is calibrated for a building of interest. The building of interest includes building equipment operable to control a variable state of the building. The simulated data of system states are generated using the calibrated simulation model. A surrogate model is trained based on the simulated data of system states from the calibrated simulation model. System state predictions are generated using the surrogate model. The surrogate model is re-trained based on updated operational data. An updated series of system state predictions is generated using the re-trained surrogate model.

23 Claims, 10 Drawing Sheets

ADAPTIVELY LEARNING SURROGATE MODEL FOR PREDICTING BUILDING SYSTEM DYNAMICS FROM SIMULATION MODEL

BACKGROUND

The present disclosure relates generally to a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

SUMMARY

According to various embodiments, a building management system for training an surrogate model for predicting building system dynamics from a simulation model is disclosed. The method includes calibrating the simulation model for a building of interest, the building of interest including building equipment operable to control a variable state of the building, generating simulated data of system states using the calibrated simulation model, training the surrogate model based on the simulated data from the calibrated simulation model, generating system state predictions using the surrogate model, re-training the surrogate model based on updated operational data, and generating an updated series of system state predictions using the re-trained surrogate model.

According to another embodiment, a building management system is disclosed. The building management system includes one or more processing circuits configured to calibrate a simulation model for a building of interest, generate simulated data of system states using the calibrated simulation model, train a surrogate model based on the simulated data of system states from the calibrated simulation model, generate system state predictions using the surrogate model, re-train the surrogate model based on updated operational data, and generate an updated series of system state predictions using the re-trained surrogate model.

According to some embodiments, one or more computer-readable storage media having instructions stored thereon that, when executed by one or more processors, cause the one or more processors to perform several operations. The operations include calibrating a simulation model, generating simulated data of system states using the calibrated simulation model, training a surrogate model based on the simulated data from the calibrated simulation model, generating system state predictions using the surrogate model, re-training the surrogate model based on updated operational data, and generating an updated series of system state predictions using the re-trained surrogate model.

DETAILED DESCRIPTION

Overview

Figure 1:
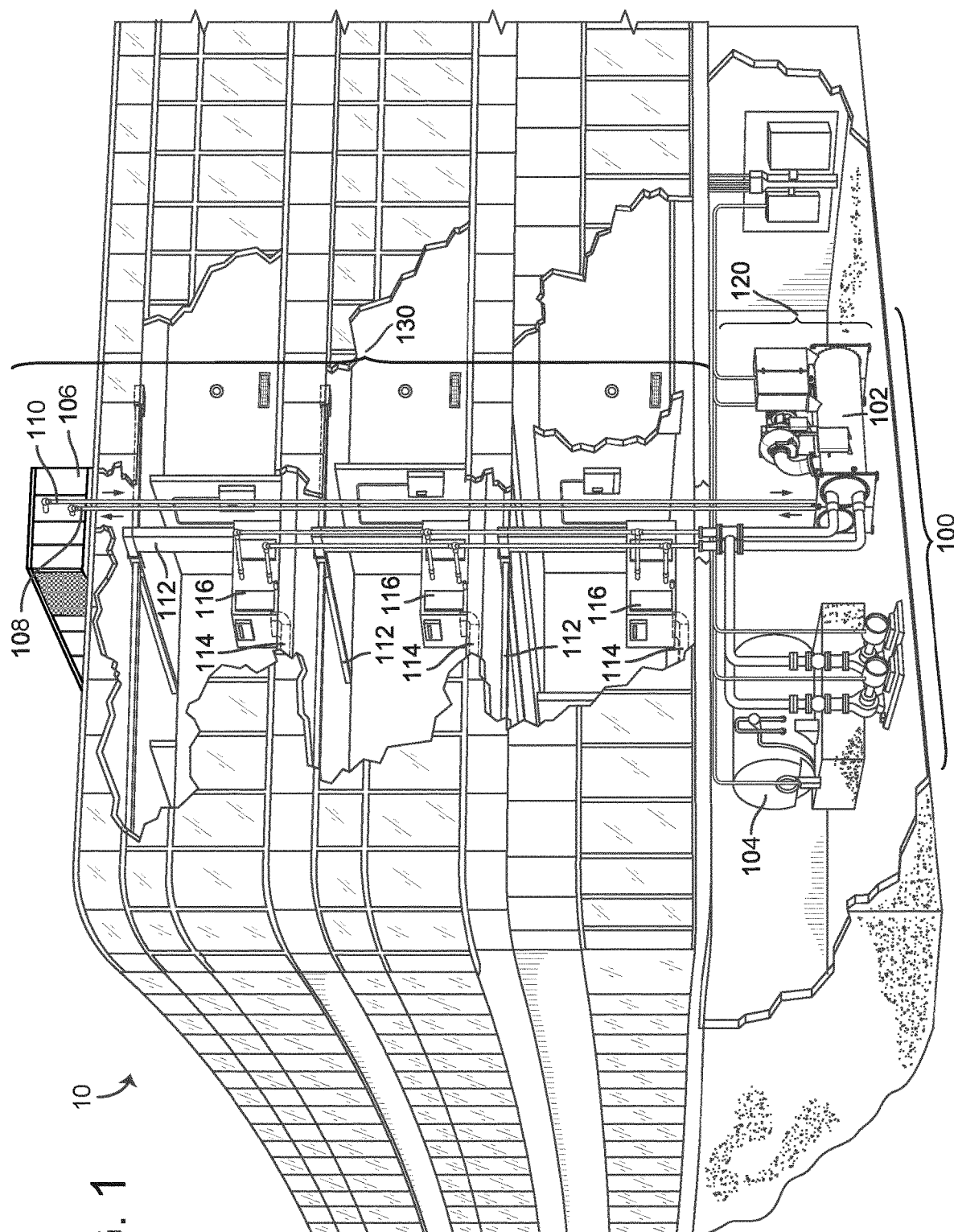
FIG. 1 is a drawing of a building equipped with a HVAC system, according to an exemplary embodiment.

Disclosed herein are systems and methods for modeling the building system dynamics of a system in a building of interest. The building system dynamics may be for an HVAC system, or for other building systems, such as a power distribution system, a load management system, a security system, a lighting system, etc. The prediction system may initially use a simulation model calibrated for the building of interest to fit historic operational data from operation of building equipment in a building system. The calibrated simulation model may be trained off a small amount of historic operational data from a building system, such as less than a month of historic operational data. In various embodiments, the data generated from the calibrated simulation model is then used to train a Deep Neural Network (DNN) based surrogate model to predict system states (e.g., heat transfer dynamics) of a building system (e.g., an HVAC system). The prediction system may then collect updated operational data from operation of building equipment when the building of interest is online (i.e., occupied, operating equipment in an HVAC system, sensors collecting data, etc.). Once a predetermined amount of updated operational data is accumulated, the prediction system may further re-train the surrogate model using the updated operational data to adaptively learn new building system dynamics. The prediction system may allow the surrogate model to learn in two separate stages of development. The first stage of development may include training the surrogate model using simulated operational data from a calibrated simulation model (e.g., EnergyPlus™). The calibrated simulation model may be trained with a limited amount of historic operational data (e.g., less than a year's worth of data, three months of data, etc.) for a new building of interest.

In some embodiments, the prediction system greatly improves the accuracy of the predicted building system dynamics of a building system, such as an HVAC system, by improving the learning capabilities of the surrogate model. Further, the prediction system may allow the surrogate model to quickly generate a first series of system state predictions for a building system in a newer building of interest. Conventionally, DNN models require a very large amount of historic operational data from devices in a building system. By first using a less complex model, such as a calibrated simulation model, to generate simulated operational data for initial training of the surrogate model, the delay in application of the surrogate model can be drastically reduced. Furthermore, the amount of computational power needed in training the surrogate model can also be greatly reduced.

The methods of using the generated data from the calibrated simulation model to initially train the surrogate model disclosed herein may significantly decrease the computing resources needed to develop the overall prediction system. A substantial amount of computational power and time may be saved using the historic operational data to calibrate the simulation model first, rather than training the surrogate model with the DNN architecture after enough historic operational data is finally collected. Instead of using a vast amount of computing resources for initial training of the surrogate model with the large amount of historic operational data collected over a long period of time (e.g., over a year), the saved computing resources may be utilized elsewhere. For example, the saved computing resources may then be utilized for improving control of a building to optimize energy costs. Additionally, the methodologies described herein may provide for similar performance of the surrogate model as when trained with actual building data over a long timeframe, but in a much shorter timeframe.

As described herein, the simulated data may be data generated by a simulation model of a particular building system to predict future states and rewards of the system, but does not rely on measurements from actual operation of the particular building system. Simulated operational data (used interchangeably with simulated training data, generated training data, simulated experience data) may be generated using data measured by different HVAC systems or otherwise rely on other HVAC operational knowledge or experience. Real operational data (used interchangeably with updated operational data, measured operational data, actual operational data, real experience data) should be appreciated as data measured by the particular HVAC system during operation in a building of interest. Updated operational data may be measured or collected while the particular HVAC system is using the DNN based surrogate model, or any other control algorithm, to control operation of the HVAC system. The system may be configured to associate a state-action pair with a measured reward or future state.

Building HVAC Systems and Building Management Systems

Figure 2:
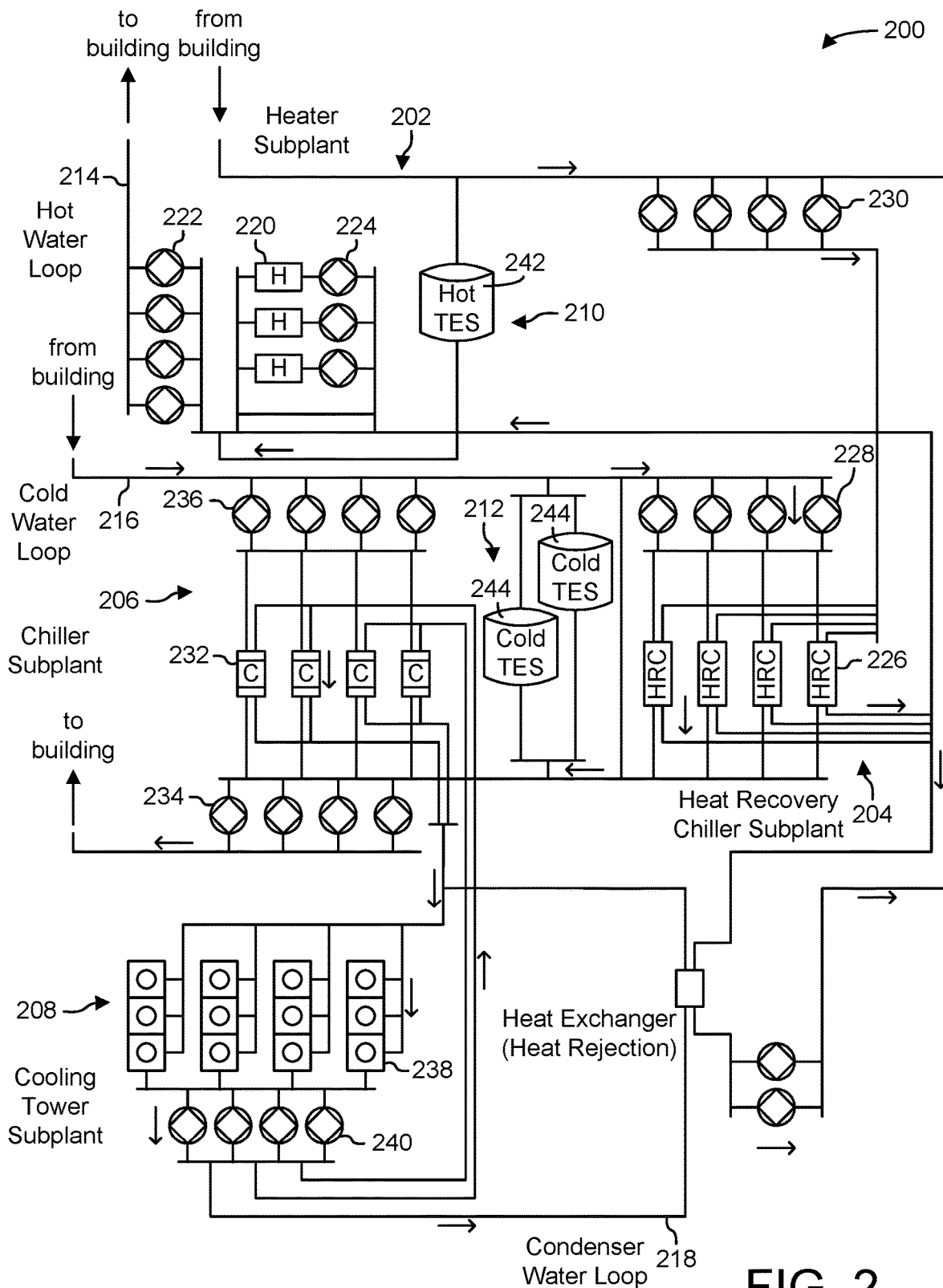
FIG. 2 is a block diagram of a waterside system which can be used to serve the building of FIG. 1, according to an exemplary embodiment.
Figure 3:
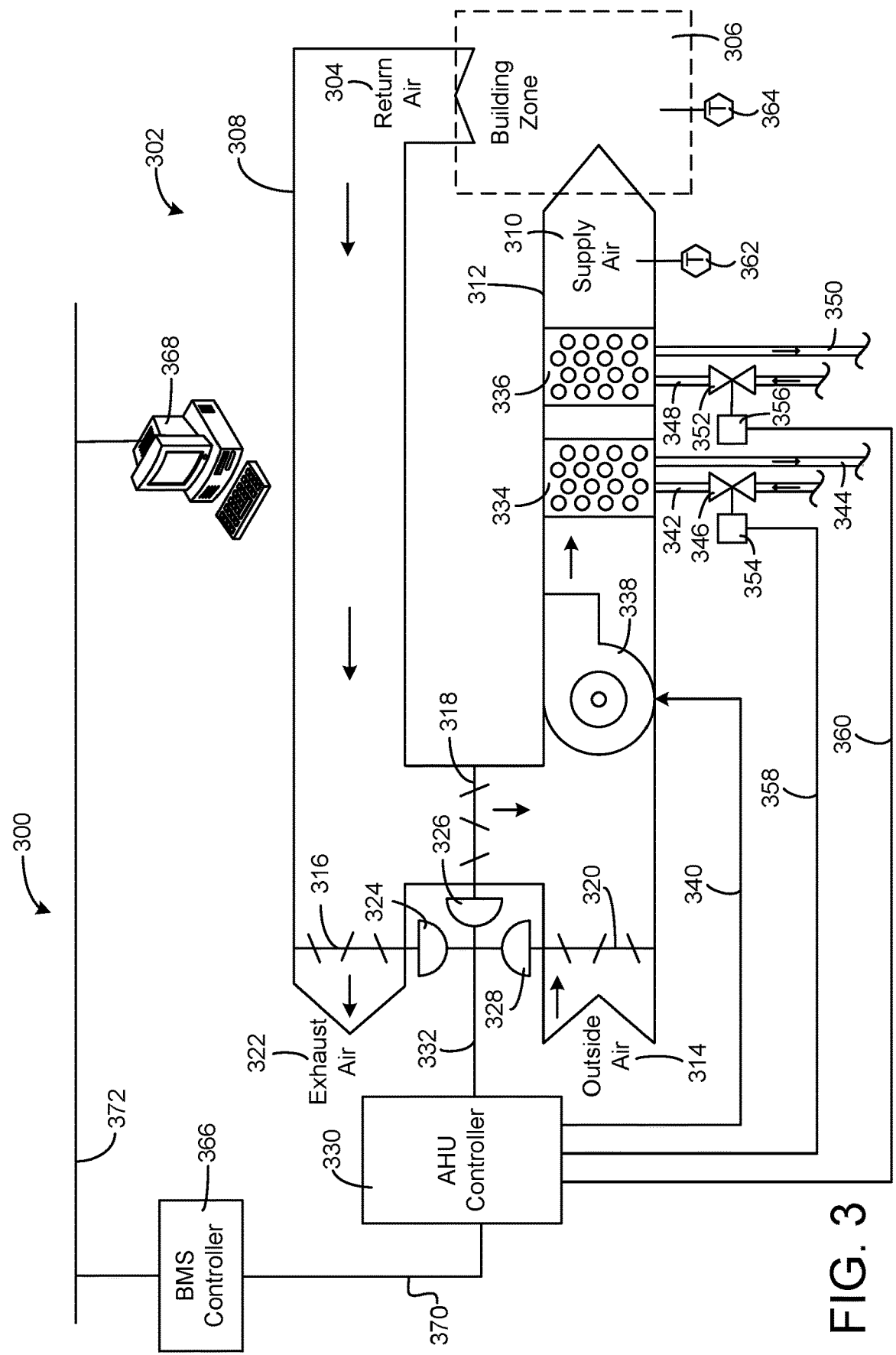
FIG. 3 is a block diagram of an airside system which can be used to serve the building of FIG. 1, according to an exemplary embodiment.
Figure 4:
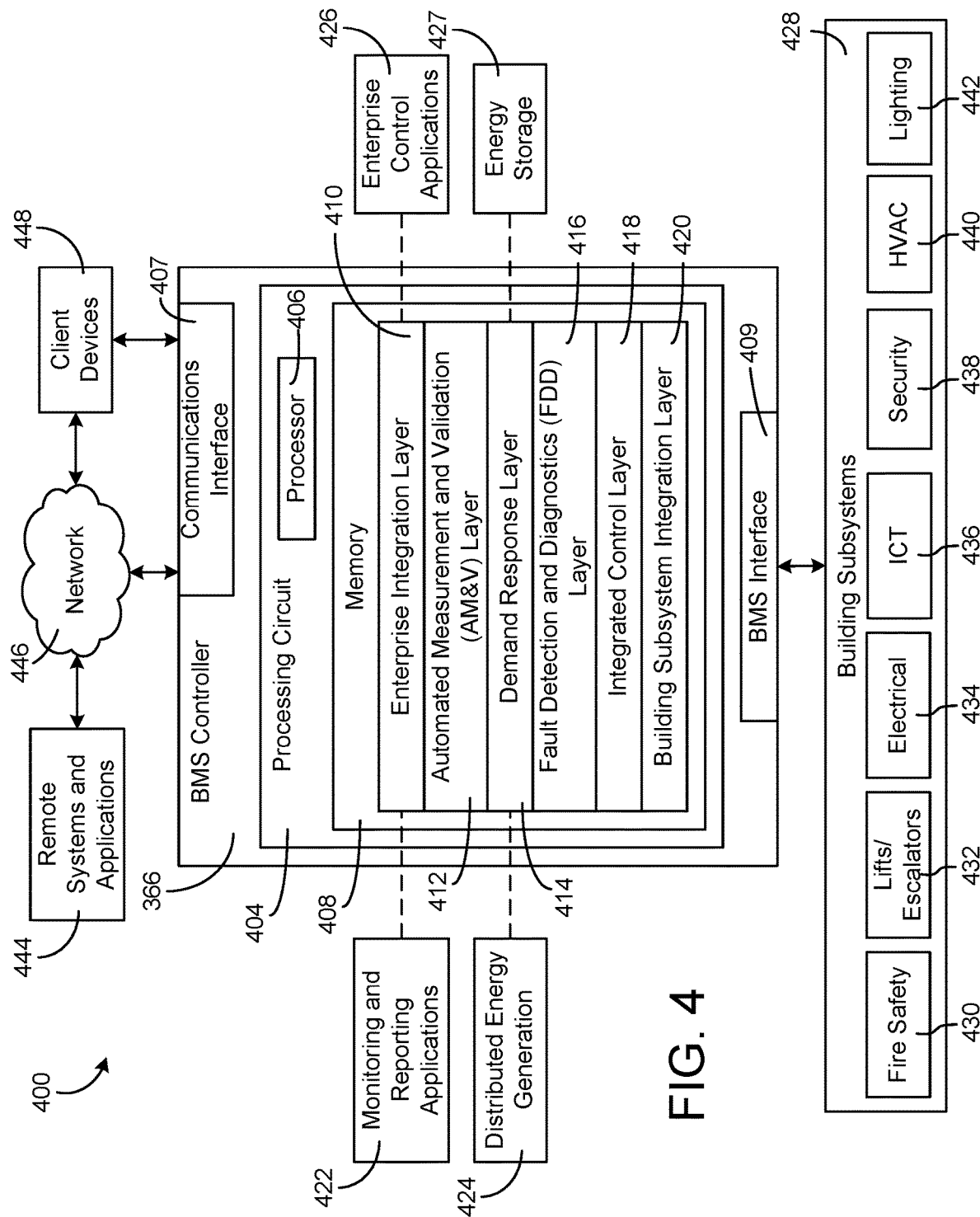
FIG. 4 is a block diagram of a building management system (BMS) which can be used to monitor and control the building of FIG. 1, according to an exemplary embodiment.
Figure 5:
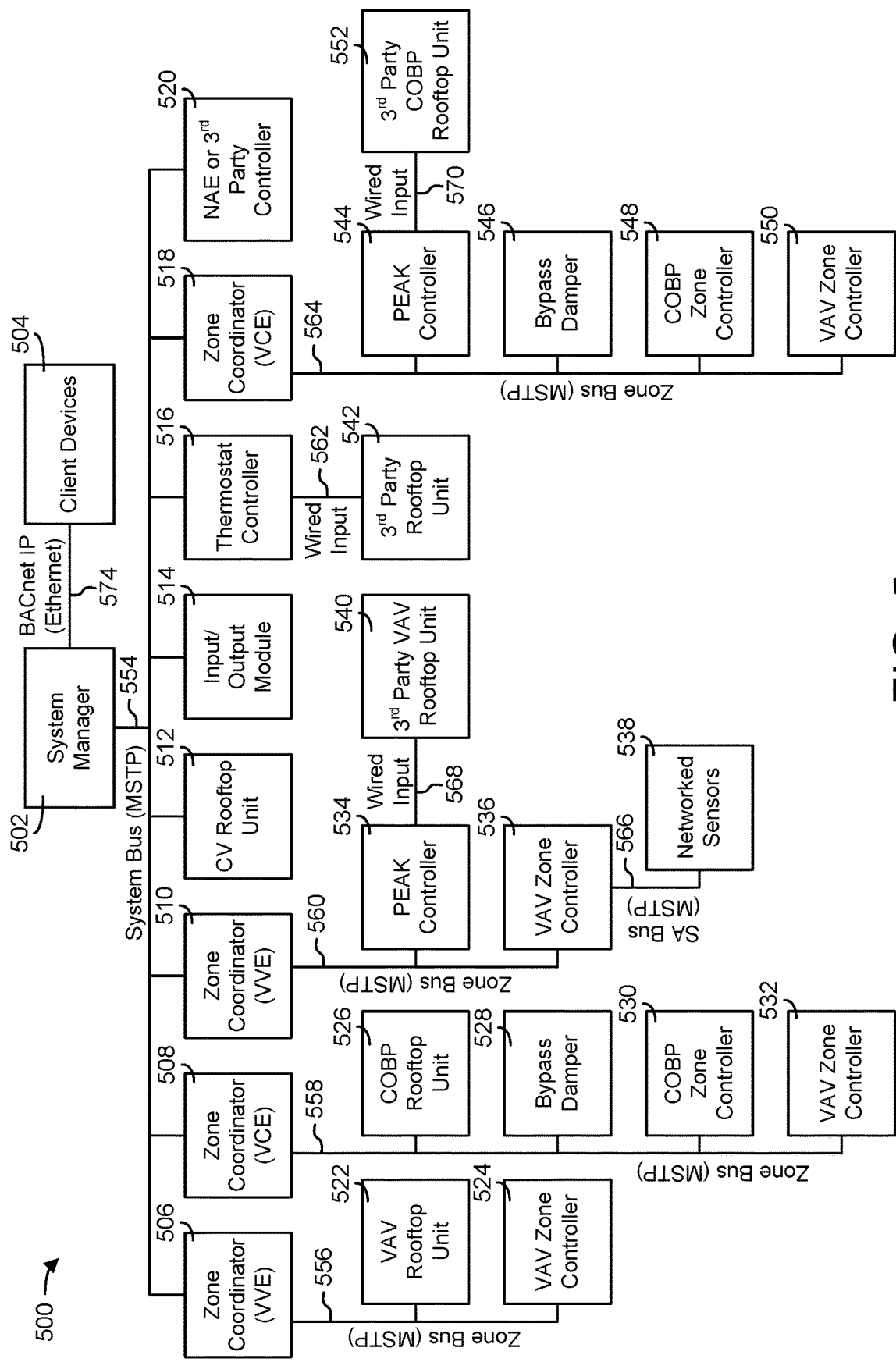
FIG. 5 is a block diagram of another BMS which can be used to monitor and control the building of FIG. 1, according to an exemplary embodiment.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine control actions for building subsystems 428 based on the inputs, generate control signals based on the control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine a set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated super-system. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Adaptively Learning Surrogate Model for Predicting Building System Dynamics from a Simulation Model Model predictive control (MPC) of an HVAC system can greatly improve energy optimization and control of the HVAC system of a building. In order to use MPC, heat transfer dynamics of the HVAC system, such as temperatures of various zones in the building, energy consumption of the building and/or components of the HVAC subsystems (e.g., chiller, AHU, heating and cooling coils, fan, etc.) may be required. Conventionally, DNN models are strong modeling techniques for the prediction of these heat transfer dynamics of HVAC systems. However, due to the numerous modeling parameters necessary for DNN models, DNN models may require a large amount of historic HVAC system operational data in order to train the DNN model. Typically, a predictive DNN model requires more than a year's worth of this historic operational data. Therefore, if a prediction model is needed for MPC of an HVAC system in a newer building, the DNN model may not be utilized for predicting heat transfer dynamics until the large amount of operational data is acquired. By waiting for enough historic operational data to be collected, energy savings from control of the HVAC system may be lost. HVAC systems of buildings, such as commercial and residential buildings, can consume roughly half of the energy consumption of the building. As such, the loss of the potential for energy savings can be extremely costly.

In order to address this problem, the disclosure presents systems and methods for calibrating a simulation model, generating simulated training data from the calibrated simulation model for training a DNN based surrogate model, and using the generated data from the calibrated simulation model to train the surrogate model initially offline. Offline training of the surrogate model can refer to training the model before occupation of the building of interest, before a new building begins operating its HVAC system, and/or before a threshold amount of updated operational data is received from building equipment in a the building of interest. Once enough updated operational data has been acquired from the HVAC system in the building of interest, the surrogate model is then re-trained online in an additional stage of development using the updated operational data. The surrogate model is a DNN model for continuous and adaptive learning over time using real operational data of an HVAC system that is collected from a building of interest.

Advantageously, using a simulation model (e.g., the calibrated simulation model) that uses a small amount of input parameters and a small amount of historic operational data to generate initial training data drastically shortens the time before the surrogate model is trained and can be utilized to improve the control of an HVAC system. Thus, the delay in time to value of the overall prediction model is reduced, without losing the benefits of using a model with a DNN architecture. One or more of these benefits may include the ability to model non-linear effects, model unknown relationships in the training data, and identification of unknown, complex variables.

Furthermore, the application of the calibrated simulation model as disclosed herein can significantly reduce the computing resources needed to develop the trained, overall prediction model. Using the historic operational data to calibrate the simulation model first requires much less computational power and time than training the surrogate model with the DNN architecture after enough historic operational data is finally collected. As such, the computing resources can be better allocated for improving the control of the building instead of for collecting a large amount of HVAC system operational data over a long period of time (e.g., greater than a year) and training the surrogate model with that historic operational data versus the simulated training data generated by the calibrated simulation model.

In some embodiments, the building system dynamics as described herein are heat transfer dynamics for use in modeling future states of an HVAC system. In various implementations, however, the building system dynamics may be used in modeling other building systems, such as security systems, lighting systems, fire safety systems, power distribution systems, etc. for a building of interest. For example, the building system dynamics may include power consumption of a fire safety device or power consumption of a wireless network used in the building of interest. In other embodiments, the system identification model described herein generates predicted system parameters based on historic data of other systems outside of building management systems.

Herein, any simulated training data, historic operational data, or real operational data (such as that received from an HVAC system) can include timeseries data. A timeseries can include a series of values for the same point and a timestamp for each of the data values. For example, a timeseries for a point provided by a temperature sensor can include a series of temperature values measured by the temperature sensor and the corresponding times at which the temperature values were measured. An example of a timeseries which can be generated is as follows:
[<key, timestamp1, value1>, <key, timestamp2, value2>, <key, timestamp3, value3>]
where key is an identifier of the source of the raw data samples (e.g., timeseries ID, sensor ID, device ID, etc.), timestamp, may identify the time at which the ith sample was collected, and value, may indicate the value of the ith sample. Time series data may allow modeling systems or analytic systems to correlate data in time and identify data trends over time for either model training or execution.

Figure 6:
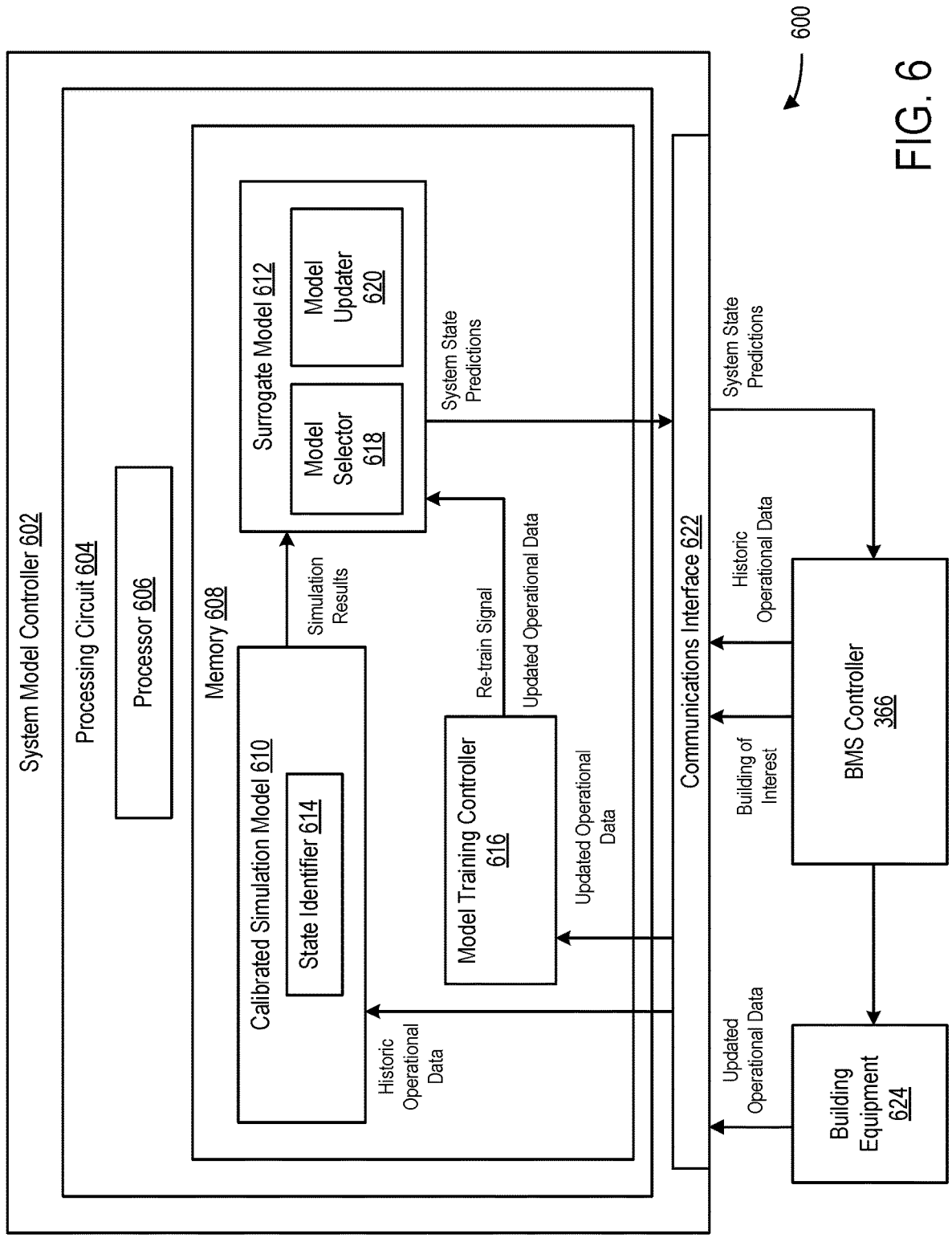
FIG. 6 is a block diagram of a prediction system for training a deep neural network (DNN) based surrogate model to predict building system dynamics using generated data from a calibrated simulation model, according to an exemplary embodiment.

Referring now to FIG. 6, a prediction system 600 including a system model controller 602, BMS controller 366, building equipment 624, and the interactions between these components, is shown, according to some embodiments. In some embodiments, the prediction system 600 allows a final predictive model (e.g., surrogate model 604) to be generated from raw training data without any manual intervention. In some embodiments, the prediction system 600 is integrated with the BMS or HVAC system of a building. The system model controller 602 may automate a process for creating predictive models that may be utilized in model predictive control and/or other control environments for a building. The system model controller 602 may be similar to and/or the same as BMS controller 366 described above with reference to FIG. 4. In some embodiments, the system model controller 602 is incorporated with the BMS controller 366 instead of being a separate module. In other embodiments, functionalities of the BMS controller 366 are programmed into the system model controller 602 as well.

System model controller 602 is shown to include a communications interface 622 and a processing circuit 604. Communications interface 622 may include wired or wireless interfaces. (e.g., jacks, antennas, transmitters, receivers, transceivers, wire terminals, etc.) for conducting data communications with various systems, devices, or networks. For example, communications interface 622 may include an Ethernet card and port for sending and receiving data via an Ethernet-based communications network and/or a Wi-Fi transceiver for communicating via a wireless communications network. Communications interface 622 may be configured to communicate via local area networks or wide area networks (e.g., the Internet, a building WAN, etc.) and may use a variety of communications protocols (e.g., BACnet, IP, LON, etc.).

Communications interface 622 may be a network interface configured to facilitate electronic data communications between the system model controller 602 and various external systems or devices (e.g., building equipment 624, various environmental sensors, etc.). For example, system model controller 602 may receive operational data indicating a current setpoint of one of the building equipment 624 and/or building environment data from sensors indicating one or more conditions (e.g., temperature, humidity, air quality, etc.) via communications interface 622. In some embodiments, communications interface 622 may be configured to provide control signals to HVAC equipment 210.

Still referring to FIG. 6, processing circuit 604 is shown to include a processor 606 and memory 608. Processor 606 may be a general purpose or specific purpose processor, an application specific integrated circuit (ASIC), one or more field programmable gate arrays (FPGAs), a group of processing components, or other suitable processing components. Processor 606 may be configured to execute computer code or instructions stored in memory 608 or received from other computer readable media (e.g., CDROM, network storage, a remote server, etc.). In some embodiments, processing circuit 604 includes one or more processors similar to or the same as processor 606 to handle a greater need for computational power.

Memory 608 may include one or more devices (e.g., memory units, memory devices, storage devices, etc.) for storing data and/or computer code for completing and/or facilitating the various processes described in the present disclosure. Memory 608 may include random access memory (RAM), read-only memory (ROM), hard drive storage, temporary storage, non-volatile memory, flash memory, optical memory, or any other suitable memory for storing software objects and/or computer instructions. For example, the memory 608 stores programming logic that, when executed by the processor 606, controls the operation of the system model controller 602. Memory 608 may include database components, object code components, script components, or any other type of information structure for supporting the various activities and information structures described in the present disclosure. Memory 608 may be communicably connected to processor 606 via processing circuit 604 and may also include computer code for executing (e.g., by processor 606) one or more processes (e.g., process 700 described with reference to FIG. 7) described herein. In some embodiments, one or more components of memory 608 are combined into a single component. The description and representation of the components of memory 608 are not meant to be limiting, and one of ordinary skill in the art may recognize more or less components may exist in memory 608 to carry out the same functions as described herein. The memory 608 is shown to include a calibrated simulation model 610, a surrogate model 612, and a model training controller 616. The various components of memory 608 may be implemented as any combination of hardware components and machine-readable media included with the memory 608.

When describing the separate models that can be used for the surrogate model 614 of the prediction system 600 below, control nomenclature is used, with variables u for inputs, y for measured outputs, and x for internal states. For inputs, generally no distinction is made between directly manipulated inputs (e.g., zone temperature setpoint) and exogenous parameters and disturbances (e.g., ambient temperature). $u_t$ contains both time-of-day and day-of-week information associated with the current sample t. Thus, although the models described below are technically time-invariant, they still implicitly contain time-varying quantities associated with the corresponding inputs. For outputs, y is used for the quantities that may need to be predicted by the surrogate model 612 (e.g., zone temperature and AHU duties), while z is used to represent auxiliary measured quantities that do not need to be predicted, but that nonetheless may be useful to the models of the prediction system 600. A key distinction between z and u is that future values of u are assumed to be known at prediction time, whereas for z, only past values are known. Capital letters U, Y, and Z are used to represent finite timeseries sequences of the corresponding variables, with superscripts p and f for "past" and "future" respectively. The surrogate model 612 may be discrete-time with a constant timestep of $\Delta=15$ minutes. In other embodiments, the constant timestep is greater than or less than 15 minutes. Generally, the index t is used for absolute time and k is used for relative time within a given sequence.

In some embodiments, the overall architecture of a prediction function $\mathcal{P}(\bullet)$ for the surrogate model 612 is $$\hat{Y}_t^f := (\vec{y}_{t+1}^f, \vec{y}_{t+2}^f, \ldots, \vec{y}_{t+k}^f, \ldots) = \mathcal{P}(U_t^p, Y_t^p, Z_t^p, U_t^f)$$

The prediction function may be used for training samples indexed by "current" time t. $U_t^p$ represents the past day's inputs (i.e., for times t−96 through t−1). $Y^p$ and $Z^p$ represent the past and most recent measured outputs (i.e., for times t−96 through t). Since the measurements are pointwise, there is an extra time point relative to U. Similarly, $U_t^f$ represents the inputs for the next two days (i.e., times t through t+191), while $Y_t^f$ represents the corresponding future measurements (i.e., times t+1 through t+192). As such, each training sample consists of one day of y and z measurements with three days of u values. In some embodiments, each of the prediction functions $\mathcal{P}(\bullet)$ consist of a state estimation function $E(\bullet)$ and a state-space prediction model $f(\bullet), h(\bullet)$ with the following composed structure:

$$\mathcal{P}(U_t^p, Y_t^p, Z_t^p, U_t^f) = (\hat{y}_1^f, \hat{y}_2^f, \ldots, \hat{y}_k^f, \ldots)$$

$$\hat{y}_k^f = h(\hat{x}_k, u_k^f)$$

$$\hat{x}_{k+1} = f(\hat{x}_k, u_k^f)$$

$$\hat{x}_0 = E(U_t^p, Y_t^p, Z_t^p)$$

The state-space model may advance the state while creating predictions starting from the estimated initial state $\hat{x}_0$ generated by the state estimation function. In some embodiments, the estimator function $E(\bullet)$ may have a similar recurrent structure to $f(\bullet)$, however, in other embodiments the structures may differ.

In some embodiments, the calibrated simulation model 610 is designed to generate simulation results (i.e., heat transfer dynamics, such as temperatures of a zone) for a state of an HVAC system in a building of interest. For example, the calibrated simulation model 610 may output a predicted temperature of the air in a zone of a new building and auxiliary output variables, such as the electrical fan power of an AHU, the heating coil loads of an AHU, and/or the AHU cooling coil loads. The calibrated simulation model 610 may receive ambient outdoor temperatures, zone temperature setpoints, date and time data, occupancy data (e.g., a binary occupancy flag that indicates a building is occupied with a 1 and is unoccupied with a 0), and auxiliary input variables, including but not limited to ambient humidity, supply temperature setpoints for an AHU, and solar loads or cloudiness. The calibrated simulation model 610 may be used to generate training data for the surrogate model 612 when a new building is "offline." The calibrated simulation model 610 may also be used when a building has a limited amount of historic operational data to train the surrogate model 612.

In some embodiments, the internal loads, operating strategies, operating schedules, and specific building parameters of the HVAC system for the building of interest are loaded into a simulation engine (e.g., DesignBuilder™ simulation engine) to model building zones and thermal dynamics for the HVAC system in its environment. The system parameter identifiers 612 may be configured to analyze historic operational data of an HVAC system received from the communications interface 622 to determine inputs to the use for the simulation engine. The calibrated simulation model 610 may then receive the building data from the simulation engine, which may be received as an Intermediate Data Format (IDF) file, for example. Weather data may also be introduced to the calibrated simulation model 610 in order to simulate how building loads can change over a week, month, or year, for example. The calibrated simulation model 610 may also determine actions to perform in a given state and predict a resultant state and reward, such as heat gains, temperatures, and energy consumption or cost that can be structured and stored as simulated training data for the HVAC system.

In some embodiments, the calibrated simulation model 610 may be modeled in an EnergyPlus™, eQUEST™, Python, or Simscape simulation program. Calibrated simulation model 610 may generally use a plethora of data inputs to simulate how system behavior will determine state changes and rewards over a time interval. Data inputs could include, but are not limited to, predicted weather patterns, energy rates, system efficiencies, environmental dynamics, occupancy data, equipment models, and other building simulation data. In some embodiments, the calibrated simulation model 610 uses the data inputs to generate predicted results, such as predicted states of the HVAC, which are then used as the simulated training data for the surrogate model 612. In other embodiments, the calibration simulation model 610 may also generate potential energy savings of an HVAC system for the building of interest. The calibrated simulation model 610 may also generate a predicted control action for any number of system states, such that subsequent training of the surrogate model 612 can use the predicted control for initial training. Given the complexity of analysis, calibrated simulation model 610 can generally produce more accurate simulated experience data to use as initial training data for the surrogate model 612 than other dynamic models.

Figure 8:
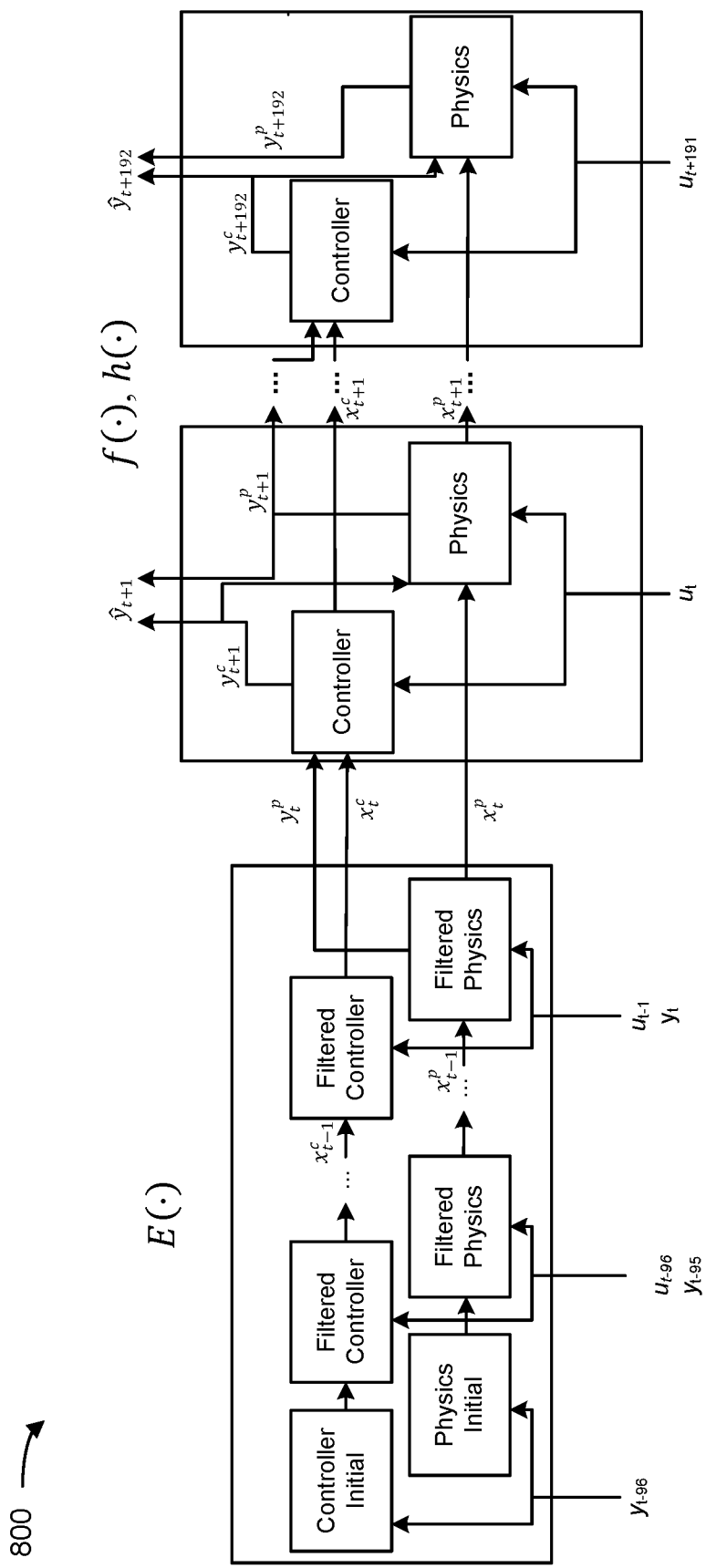
FIG. 8 is a block diagram of the structure of a deep neural network (DNN) model which can be used as the surrogate model of FIG. 6, according to an exemplary embodiment.
Figure 9:
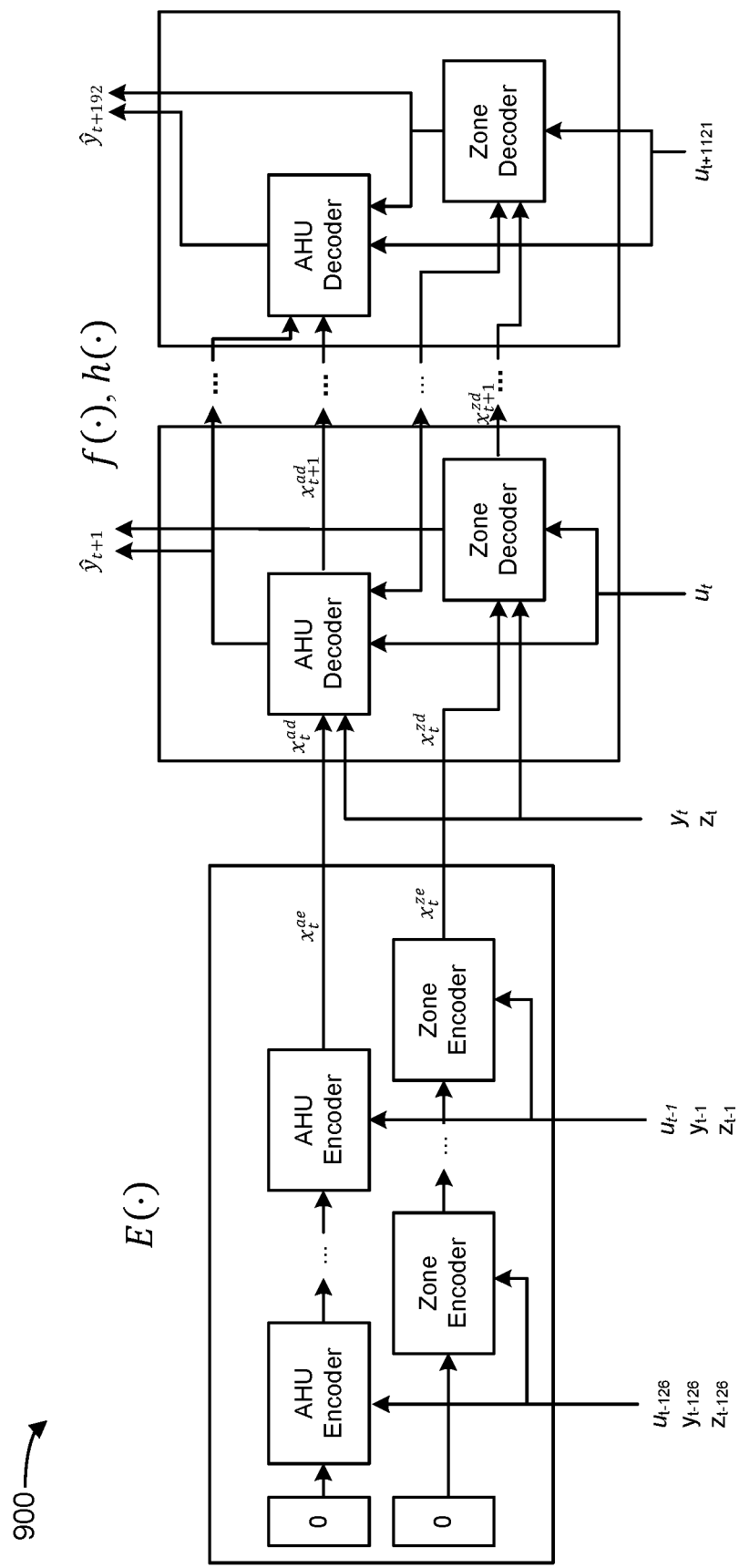
FIG. 9 is a block diagram of the structure of another DNN model which can be used as the surrogate model of FIG. 6, according to an exemplary embodiment.
Figure 10:
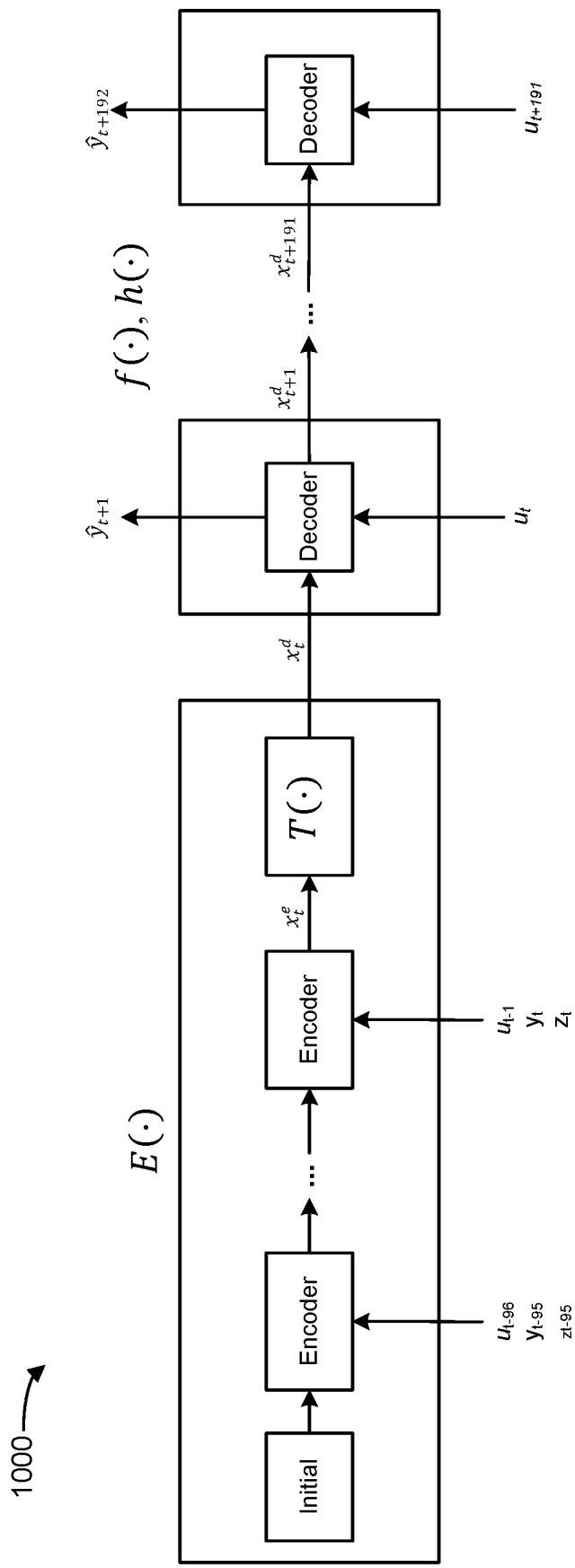
FIG. 10 is a block diagram of the structure of another DNN model which can be used as the surrogate model of FIG. 6, according to an exemplary embodiment.

Still referring to FIG. 6, the surrogate model 612 is shown to include a model selector 618 and a model updater 620. In some embodiments, the model selector 618 is configured to determine what structure for the DNN based surrogate model 612 to use in creating overall predictions of building system dynamics for a building system (e.g., an HVAC system) in the building of interest. For example, the model selector 618 may choose to use a "structured" DNN model structure as shown in FIG. 8, a "hierarchical" structure as shown in FIG. 9, a "monolithic" structure as shown in FIG. 10, or another structure that may be used with a DNN model architecture. The model selector 618 may choose the type of structure to use for the DNN architecure based on the need for the quickest output of predicted building system dynamics (e.g., heat transfer dynamics), the type of generated training data received from the calibrated simulation model 610, or an instruction from the model training controller 618 to use a specific type of structure. The model updater 620 may be configured to receive an instruction signal from the model training controller 616 and may begin teaching the surrogate model 612 updated operational data from the HVAC system of the building of interest in a second stage of development. As such, the model updater 620 may be configured to analyze the updated operational data received from the model training controller 616 to determine how the inputs are fed into the selected type of DNN model. After the model updater 620 completes re-training of the surrogate model 612, the model updater 620 may be configured to output the updated series of system state predictions to the communications interface 622. As such, the BMS controller 366 may use the system state predictions to determine control instructions for the operation of building equipment 624 (e.g., HVAC equipment in the building of interest).

The surrogate model 612 is configured to be based on a DNN model for the ability to continuously learn after initial offline training using the generated training data in the simulation results from calibrated simulation model 610. The DNN architecture may allow the surrogate model to be re-trained using updated operational data from the building equipment 624. The desired goal for the prediction function output of the surrogate model 612 is for the predicted values to satisfy $\hat{y}_{t+k}^f \approx y_{t+k}$. In some embodiments, the surrogate model 612 may be extended to make predictions arbitrarily far into the future, provided that inputs u are known. Despite the structure of the surrogate model 612 having a fixed length of past sequences at training time, the effective prediction horizon may then be varied as needed for particular applications. In some embodiments, the DNN architecture is a recurrent neural network (RNN). The structure of the surrogate model 612 may include a great use of LSTM networks. For example, the structures of the DNN model 800, DNN model 900, and DNN model 1200, described in greater detail with references to FIGS. 10-12, all utilize LSTM networks.

In some embodiments, the LSTM networks of the surrogate model 612 have an LSTM recurrence relation in the following standard state-space form. The LSTM state may be split into separate components $x^1$ and $x^2$, which evolve according to $$x_{t+1}^1 = \sigma(\phi_1) \circ \tan h(x_{t+1}^2)$$

$$x_{t+1}^2 = x_t^2 \circ \sigma(\phi_2) + \sigma(\phi_3) \circ \tan h(\phi_4)$$

$$\phi_i := A_i x_t^1 + B_i u_t + K_i (y_t - C x_t^1 - h) + f_i, \; i \in \{1,2,3,4\}$$

$$y_t = C x_t^1 + h$$

$x^1$ in the above relations is the "velocity" state that determines the change in the "position" state $x^2$. By choosing the i=2 weights appropriately, $x^2$ may become a pure integrator, which beneficially allows long-term retention of information. The two substates are generally chosen to have the same number of components. References to an "LSTM with N units" indicates that both $x^1$ and $x^2$ are N-dimensional vectors. In the LSTM recurrence relations above, the trainable model parameters are the $A_i$, $B_i$, $K_i$, and $f_i$, as well as C and h, where $f_i$ and h are state-space prediction models.

The state update equations for the LSTM networks for the surrogate model 612 may then be given as $$x_{k+1} := \begin{pmatrix} x_{k+1}^1 \\ x_{k+1}^2 \end{pmatrix} = f_{LSTM}(x_k, u_k, y_k), \; y_k = h_{LSTM}(x_k)$$

with $x := (x^1, x^2)$. These equations may be referred to as the "innovations-form" LSTM, as the output measurement y appears as an innovation term $y - \hat{y}$ (i.e., the prediction error). In other examples, the "standard-form" LSTM simply multiplies y directly, i.e.

$$\phi_i := A_i x_t^1 + B_i u_t + K_i y_t + f_i, \; i \in \{1,2,3,4\}$$

Figure 7:
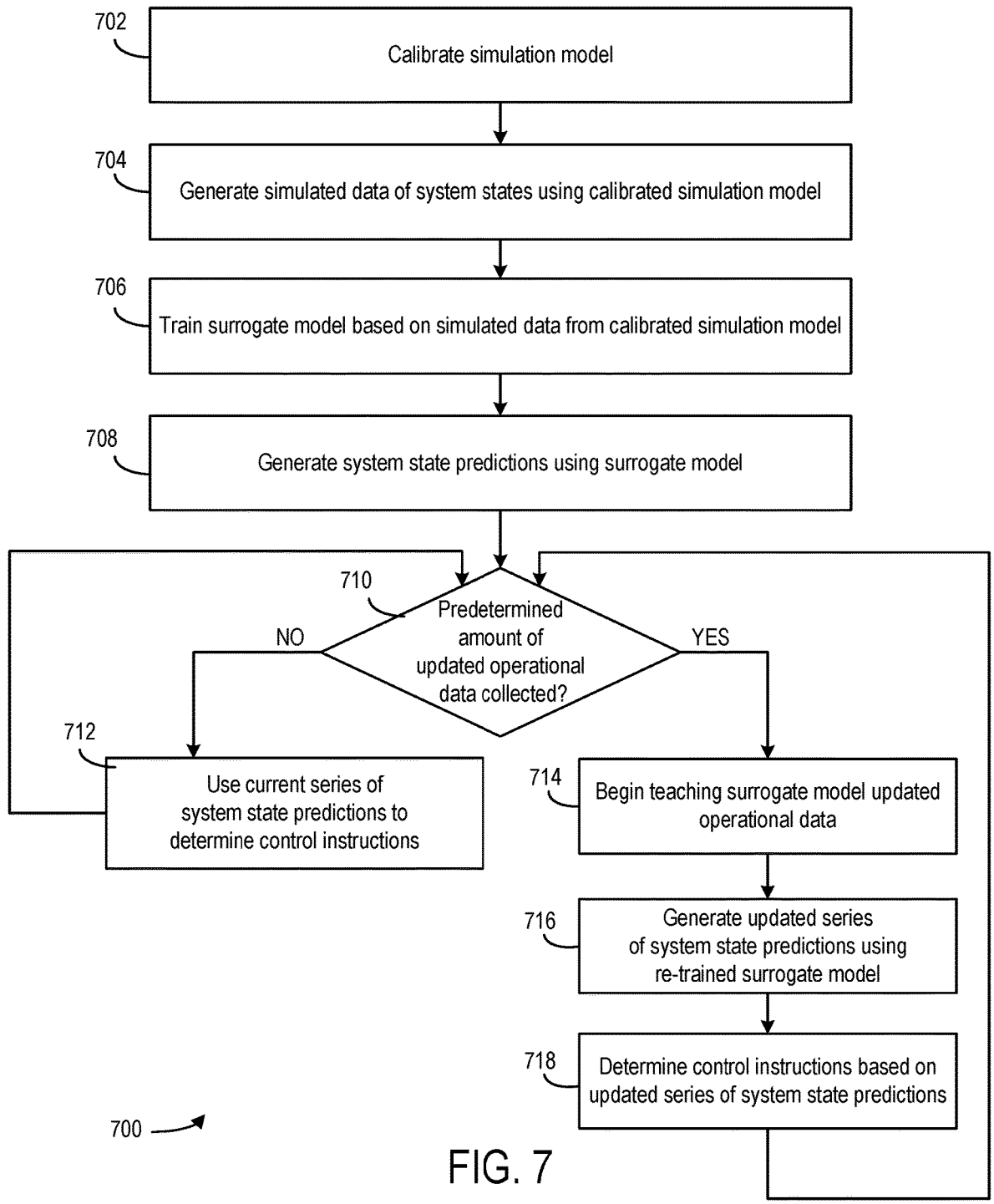
FIG. 7 is a flow diagram for training the surrogate model using generated data from the calibrated simulation model of FIG. 6, according to an exemplary embodiment.

Referring now to FIG. 7, a flow diagram of a process 700 for training an adaptive surrogate model for predicting building system dynamics for a building system based on generated data from the calibrated simulation model 610 is shown, according to an exemplary embodiment. The predicted building system dynamics may be heat transfer system states for an HVAC system in a building of interest. In some embodiments, process 700 is executed by the prediction system 600 of FIG. 6. In other embodiments, process 700 may be executed by a BMS of the building of interest.

At 702, the simulation model is calibrated for the building of interest. In some embodiments, the simulation model 610 for building energy predictions is modeled by EnergyPlus, eQUEST, or another modeling software. The calibrated simulation model 610 may be sparsely calibrated to fit historic operational data from the operation of building equipment in an HVAC system. For example, the historic operational data may be from operation of an HVAC system in a newer building. In some embodiments, the historic operational data from the operation of the building equipment includes data from less than a month of operation. The calibrated simulation model 610 may receive the historic operational data from the BMS controller 366 via the communications interface 622.

In some embodiments, the historic operational data includes, but is not limited to, zone temperature setpoints, ambient outdoor temperatures, day and time information, data for the occupancy of the building, ambient humidity, AHU supply temperature setpoints, solar loads or cloudiness and additional weather data, HVAC system data, building operating strategies, and building operating schedules. The calibrated simulation model 610 also may receive input from an Intermediate Data Format (IDF) file containing 3D geometry of the building of interest. The IDF file may be generated using inputs from the historic operational data and simulation specific parameters by a building software program, such as Design Builder. The calibrated simulation model 610 may be calibrated to fit a small amount (e.g., less than a month of data) of historic operational data from operation of building equipment in the building of interest.

At 704, the prediction system 600 is configured to generate simulated data of building system states using the calibrated simulation model 610. In some embodiments, the simulated system states are generated for an HVAC system. The generated system states may include heat transfer states that can be used by the surrogate model 612 to generate system state predictions, such as heat transfer state predictions. For example, the calibrated simulation model 610 is modeled with EnergyPlus™ simulation engine, which may generate simulated data of the temperatures, heat gains, and energy consumption in the building of interest.

At 706, surrogate model 612 is trained based on the generated data from the calibrated simulation model 610. The generated data from the calibrated simulation model 610 may replace training data of known values from a large amount of historic operational data. Beneficially, by using the calibrated simulation model 610, the surrogate model 612 may be trained and used for maintenance predictive control for a new building (e.g., building 606) without having to wait for enough real operational data of equipment in the building of interest to accumulate. In some embodiments, various DNN based models may be used as the surrogate model 612. For example, the "structured" DNN model 800 shown in FIG. 8, the "hierarchical" DNN model 900 shown in FIG. 9, or the "monolithic" DNN model 1000 shown in FIG. 10 may be used as the surrogate model 612. The model selector 618 may determine which of several options for the DNN based surrogate model 612 to use for the prediction system 600. In some embodiments, the model selector 618 chooses the type of model based on instructions received from the communications interface 622. In other embodiments, the model selector 618 may determine the DNN based model to use based on the priority of the predictions output from prediction system 600. For example, in some scenarios, the time it may take to generate predictions of the building system dynamics is less important than the accuracy of the predictions.

At 708, a first series of system state predictions is generated for a variable state of the building of interest using the surrogate model 612. In some embodiments, the surrogate model 612 predictions include, but are not limited to, a zone temperature and duties of an AHU (e.g., AHU 302), such as electrical fan power for the AHU, loads for the AHU heating coil (e.g., heating coil 336), and loads for the AHU cooling coil (e.g., cooling coil 334), in the building of interest. In other embodiments, the surrogate model 612 predictions also include energy consumption of the building of interest. In some embodiments, the overall architecture of the prediction function $\mathcal{P}(\bullet)$ generated by the surrogate model 612 is $$\hat{y}_t^f := (\hat{y}_{t+1}^f, \hat{y}_{t+2}^f, \ldots, \hat{y}_{t+k}^f, \ldots) = \mathcal{P}(U_t^p, Y_t^p, Z_t^p, U_t^f)$$

The prediction function may be used for training samples indexed by "current" time t. $U_t^p$ represents the past day's inputs (i.e., for times t−96 through t−1). $Y^p$ and $Z^p$ represent the past and most recent measured outputs (i.e., for times t−96 through t). Since the measurements are pointwise, there is an extra time point relative to U. Similarly, $U_t^f$ represents the inputs for the next two days (i.e., times t through t+191), while $Y_t^f$ represents the corresponding future measurements (i.e., times t+1 through t+192). As such, each training sample consists of one day of y and z measurements with three days of u values. The desired goal for the prediction function output of the surrogate model 612 is for the predicted values to satisfy $\hat{y}_{t+2}^f \approx y_{t+k}$. The surrogate model 612 may be extended to make predictions arbitrarily far into the future, provided that inputs u are known. Although the structure of the surrogate model 612 has a fixed length of past sequences at initial training time, the effective prediction horizon may be varied as needed for particular applications. In other embodiments, the surrogate model 612 and the calibrated simulation model 610 may both be used to generate a first series of system state predictions.

At 710, it is determined whether a predetermined amount of updated operational data from the HVAC system of the building of interest has been received. A predetermined amount of updated operational data may include an absolute amount of data, a relative amount (e.g., percentage) of data, an amount of data acquired or a relative or absolute amount of time, etc. As used herein, updated operational data refers to data generated by the operation of building equipment 624 (e.g., equipment in the HVAC system of the building of interest or another building system) after the surrogate model 612 was first initially trained using the generated data from the calibrated simulation model 610. As such, the updated operational data from the HVAC system of the building of interest is received once the building of interest is online (i.e., occupied, operating building equipment in the HVAC system, etc.). In some embodiments, the model training controller 616 receives the updated operational data from the communications interface 622 and stores the updated data, while also monitoring the amount of updated operational data received. For example, the model training controller 616 may collect the updated operational data until a specific amount has been acquired, such as a week's worth of operational data, a month's worth, etc. The model training controller 616 may then output the accumulated, updated operational data to the surrogate model 612. The updated operational data may be from the building equipment 624, including, but not limited to, equipment in the HVAC system 100 as described above. In some embodiments, the updated operational data is received from equipment in a new building, such as building 606, that recently began operation of building equipment in various zones.

If it is determined at 710 that a predetermined amount of updated operational data has been received, the surrogate model 612 begins learning the updated operational data from the building of interest (at 714). In some embodiments, the surrogate model 612 is re-trained online (i.e., the building of interest is in operation) using the updated operational data in order to improve accuracy of its predictions and learn new building system dynamics (e.g., heat transfer dynamics). The surrogate model 612 may be re-trained in the same manner as in 706, however, instead of using the simulated operational data generated by the calibrated simulation model 610 as training data, the surrogate model 612 is trained using the real operational data of the building equipment in the building of interest. This second stage of learning may allow the surrogate model 612 to improve the accuracy of the series of system state predictions for the HVAC system in the building of interest. For example, the first series of system state predictions may be less accurate than the updated series of system state predictions, but the first series may be available quickly; whereas the updated series of system state predictions generated using the re-trained surrogate model may generally be more accurate, but may take longer to generate or be available. In some embodiments, the calibrated simulation model 610 is also re-trained using the updated operational data.

Furthermore, the adaptive capability of the surrogate model 612 to be re-trained online (i.e., when the new building is occupied, new building equipment is operating, and sensors are collecting real data) with real operational data after initial offline training with the simulated data allows the surrogate model 612 to generate predictions at an earlier stage. Once the surrogate model 612 completes online re-training, an updated series of system state predictions are generated using the re-trained surrogate model 612 (716). The updated series of system state predictions from the re-trained surrogate model 612 may be generated in the same manner as the first series of system state predictions generated in step 708 by the surrogate model 612 trained only with the simulated data from calibrated simulation model 610.

At 718, control instructions may be determined for building equipment 624 in the building of interest based on the updated series of system state predictions for the HVAC system. For example, a second series of system state predictions may indicate that the temperature of a zone in the new building (e.g., building 606) is higher than a desired temperature during occupation of the building and/or during a specific time of day. Accordingly, BMS controller 366 may receive the updated, predicted zone temperature and instruct equipment in the HVAC system of the building of interest to change operation in order to lower the temperature of the zone. In other embodiments, the updated series of system state predictions are used in MPC. Beneficially, the new series of system state predictions for variable states in a building (e.g., a temperature of a zone, power consumption of an AHU, etc.) may then be used by the BMS controller 366 in controlling the operation of the HVAC system. The new series of system state predictions may also be used by the BMS controller 366 to control the operation of other building subsystems 428 to modify energy consumption of the building. The process 700 may then return to 708 and reiterate to receive additional, updated operational data from the building equipment 624 in the building of interest. Therefore, the surrogate model 612 may be re-trained repeatedly to use the most recent, updated operational data as inputs for generating heat transfer dynamics of the building of interest. As such, the surrogate model 612 may better predict the heat transfer dynamics of the variable state in the building of interest as the building continues to operate its HVAC system and as the building environment changes.

However, if it is determined that a predetermined amount of updated operational data has not been received at 710, the current series of system state predictions may continue to be used to determine control instructions for building equipment 624 (712). The model training controller 616 may continuously recheck whether a sufficient amount of updated operational data has been received in order to begin re-training the surrogate model 612. In other embodiments, the model training controller 616 may only evaluate whether a predetermined amount of updated operational data has been received from the building of interest (e.g., via a BMS controller 366) once a predetermined amount of time has passed (e.g., a day, a week, etc.).

Referring now to FIG. 8, a prediction structure of DNN model 800 is shown in greater detail, according to an exemplary embodiment. The prediction structure of the DNN model 800 may be used as the prediction structure of the surrogate model 612. In some embodiments, the DNN model 800 is referred to as a "structured" DNN model. The DNN model 800 may be a decomposition strategy derived from a particular closed-loop control structure of the zone. The DNN model 800 is based on the realization that zone controller and zone physics can be split into two independent subsystems for which all the inputs and outputs are known. The two independent subsystems may be independent, but may still be interconnected. Particularly, the local controllers in each zone may induce a sensible cooling load on the zone, which induces zone heat-transfer physics to affect the zone temperature. The zone temperature may then be measured by the controller. The measured zone temperature then may lead to a change in the sensible cooling load on the zone, and then the overall process may repeat.

The overall architecture of the DNN model 800 may mathematically partition the overall state x of the system into substates $x^c$ for the controller and $x^p$ for the physics, each with corresponding outputs $y^c$ and $y^p$. The inputs u may largely be shared by both sub-models. In some embodiments, the general prediction structure of the DNN model 800 is:

$$x_{k+1}^c = f^c(x_k^c, y_k, y_k^p, u_{t+k})$$

$$y_k^c = h^c(x_k^c)$$

$$x_{k+1}^p = f^p(X_k^p, y_{k+1}^c, y_k^p, u_{t+k})$$

$$y_k^p = h^p(x_k^p)$$

The presence of $y_k^c$ as an argument to $f^c(\bullet)$ and $y_k^p$ as an argument to $f^p(\bullet)$ is for state-estimation purposes. By contrast, the presence of $y_k^p$ in $f^c(\bullet)$ and $y_{k+1}^c$ in $f^p(\bullet)$ may facilitate the appropriate interaction between the sub-models of the DNN model 800 architecture. The current output of the physics sub-model, the zone temperature, may be an input to the controller sub-model. In some embodiments, the controller sub-model may then output the next predicted output, such as the average zone heating and cooling duties over a current interval, which may then be used as inputs to the physics sub-model. The composite output $y_k$ of the prediction system may then be created by joining $y_k^c$ and $y_k^p$ in the appropriate order. In some embodiments, the filtered sub-models of the DNN model 800 may include the current prediction error as an additional input.

Still referring to FIG. 8, for state estimation, the oldest state may be chosen as an affine transformation of the oldest measurement $y_{t-96}$, similar to the approach in the system identification prediction. However, the coefficients of the transformation may be decision variables rather than fixed values. In some embodiments, $f^c(\bullet)$ and $f^p(\bullet)$ are then iterated through the past data, except that all values of $y_k^c$ and $y_k^p$ are the known past values from components of $y_{t+k}$. As such, during the filtering steps of the DNN model 800, there may be no interactions between the two sub-models. In some embodiments, the sub-models are in innovations-form and as such, the predicted outputs have no effect on updated states of the sub-models. Therefore, those connections are not shown in the overall estimation and prediction structure of the DNN model 800 shown in FIG. 8.

The DNN model 800 may train each sub-model separately for fifteen epochs. In other embodiments, the DNN model 800 trains each sub-model for any arbitrary number of epochs, such as more than fifteen epochs or less than fifteen epochs. In some embodiments, the outputs from the opposite sub-models are directly taken from the training data. Therefore, the training processes of the sub-models may be completely independent. In some embodiments, the controller sub-model is trained using only excitation data from training data that contains both excitation and conventional training data. The physics sub-model may be trained using both excitation training data and conventional training data. After initial training of the sub-models separately, the sub-models are combined as shown in FIG. 8 and additional epochs of training may be performed. The future y values may now be used as the output of the opposite sub-models, such as when making future predictions. Thus, the additional training steps may allow the sub-models to correct for any biases in the predictions of the other, separate sub-models. In some embodiments, weights may be saved for several best epochs during training in terms of mean squared error on the entire training dataset.

Referring to FIG. 9, a prediction structure of DNN model 900 is shown in greater detail, according to an exemplary embodiment. In some embodiments, the prediction structure of the DNN model 900 may be used as the prediction structure of the surrogate model 612. The DNN model 900 may be referred to as having a "hierarchical" model structure. Similar to the structure of the DNN model 800, the DNN model 900 may also use two separate sub-models based on the structure of the system. However, rather than decompose the physics and regulatory control, the DNN model 900 may decompose the zones and the AHU that serves the zones. In particular, the zone sub-model may predict zone temperature and airflow from temperature setpoints, while the AHU sub-model may use the predicted flows and temperatures to calculate cooling duty and fan power. In some embodiments, the structure of the DNN model 900 is referred to as "hierarchical," because the predictions flow upward from the lower level (zones sub-models) to the higher level (the AHU sub-models).

In some embodiments, both the zone sub-models and the AHU sub-models have the same structure. The structure of both the zone and the AHU sub-models may consist of two connected LSTMs that perform state estimation and prediction, respectively. The first LSTM, which is referred to as the "encoder", may take the values of past u and y as inputs at each timestep. After iterating over all of the past timesteps, the internal states of the encoder may then be used as the initial states of the second LSTM, which is referred to as the "decoder". For each timestep in the "decoder", the LSTM may also receive u and y as inputs. However, they values may now be the predictions made at the previous timestep. In some embodiments, filtering in the DNN model 900 is completely in parallel, but during prediction, the zone sub-model outputs may be inputs to the AHU sub-model.

The structure of the zone and AHU sub-models may use $x_t^{ij}$ to denote the internal LSTM states, with $i \in \{a, z\}$ for the AHU and zone sub-models, and $j \in \{e, d\}$ for the encoder or decoder. Both of the encoders may operate completely in parallel. In some embodiments, particularly, $$x_{k+1}^{ie} = f_{LSTM}^{ie}(x_k^{ie}, u_k, y_k)$$

where the oldest state (e.g., time t−96, which corresponds to k=0) is initialized to zero. The two encoders in the structure of the DNN model 900 may not directly interact. By contrast, for the decoders, the structure may be $$x_{k+1}^{zd} = f_{LSTM}^{zd}(x_k^{zd}, u_k, \hat{y}_k^{zd})$$

$$\hat{y}_{k+1}^{zd} = h_{LSTM}^{zd}(x_{k+1}^{zd})$$

$$x_{k+1}^{ad} = f_{LSTM}^{ad}(x_k^{ad}, u_k, \hat{y}_{k+1}^{zd}, \hat{y}_k^{ad})$$

$$\hat{y}_{k+1}^{ad} = h_{LSTM}^{ad}(x_{k+1}^{ad})$$

In some embodiments, all the LSTMs are in standard form, meaning that all of the u and y function arguments may be treated the same. The initial conditions can include:

$$x_0^{ie} = 0, \ x_0^{id} = x_{96}^{ie}, \ \hat{y}_0^{id} = y_{96}$$

Each of the encoder states may be initialized to zero. In some embodiments, the value of the encoder states after processing 96 timesteps of past data is used as the initial encoder state. In a similar manner, the initial "predicted" outputs may use the most recent measurement (i.e., the final element in $Y^p$). The overall DNN model 900 outputs $\hat{y}_k$ are the appropriate concatenation of $y_k^{zd}$ and $y_k^{zd}$. In some embodiments, all four LSTMs in the DNN model 900 have 50 units, meaning that each state $x^{ij}$ has 100 vector components. In other embodiments, the LSTMs in the DNN model 900 may contain more or less units, with the corresponding state $x^{ij}$ having more or less vector components.

Still referring to FIG. 9, in some embodiments, the zone sub-model outputs include both zone temperature and VAV airflow, which are components of y and z respectively for the overall prediction system of DNN model 900. Therefore, the past data inputs may include z and y, but only the relevant values of z (i.e., VAV airflow) may be used. The other values of z may be ignored. In some embodiments, the airflow predictions are not necessary predictions, and therefore may be discarded after being used by the AHU decoder. As such, only the zone temperature prediction may be included in the composite $\hat{y}_k$. The outputs of the AHU sub-model may include energy consumption terms, such as fan power and heating and cooling coil loads, all of which may be included in the composite output of the DNN model 900.

During training of the DNN model 900, each encoder and decoder pair may be trained in isolation using real data for all of the y inputs. In particular, during training, all of the decoder inputs $\hat{y}_k^{id}$ may be received from training data (e.g., generated data from calibrated simulation model 610). As such, the future predictions of the decoder may be dynamically forced by the known values. Therefore, during training, the encoder and decoder may have the same input and output structure, in which all inputs may be taken from known measurements, and the only unknown quantities may be the internal states. In some embodiments, both models are trained for fifty epochs, taking the weights at the end of the last epoch as the trained DNN model 900.

Referring now to FIG. 10, a prediction structure of DNN model 1000 is shown, according to an exemplary embodiment. The prediction structure of the DNN model 1000 may also be used as the prediction structure of the surrogate model 612. The DNN model 1000 may be referred to as having a "monolithic" model structure. In some embodiments, the DNN model 1000 uses a single LSTM encoder and decoder pair to make each prediction. As such, the structure of DNN model 1000 may be similar to the structure of the zone sub-model used in the DNN model 800. However, the DNN model 1000 may be implemented differently. As before, a state $x_k^e$ is associated with the encoder and a state $x_k^d$ is associated with the decoder. These two states may evolve as $$x_{k+1}^e = f_{LSTM}^e(x_k^d, u_k, y_{k+1}, z_{k+1})$$

$$x_{k+1}^d = f_{LSTM}^d(x_k^d, u_k)$$

$$\hat{y}_k = h_{LSTM}(x_k^d)$$

Therefore, the encoder may take all known values as inputs, while the decoder may take only $u_t$ as inputs.

In some embodiments, the offset, time indexing for u and {y, z} may be chosen such that the oldest measurement may be discarded. The output predictions of the decoder may not be fed back as inputs at the next timestep, since $\hat{y}_k$ is a linear transformation of $x_k^d$. The encoder may receive additional inputs as compared to the inputs received by the decoder. Therefore, the encoder may need a larger state to remember a sufficient amount of past information. Accordingly, the final encoder states may be passed through an affine transformation function $\mathcal{T}(\cdot)$ to obtain the initial decoder states, i.e., $$x_0^d = \mathcal{T}(x_{96}^e)$$

The matrix and vector that define $\mathcal{T}(\cdot)$ can be trainable parameters. In other embodiments, the encoder and decoder states have the same dimensions, and therefore the extra transformation may be unnecessary. The encoder initial state $x_0^e$ may also be a trainable parameter, and thus it may be held constant across all samples. In some embodiments, $x_0^e$ is chosen as an affine transformation of $y_{t-96}$ (as is done in the "structured" DNN model 800).

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data, which cause a general purpose computer, special purpose computer, or special purpose processing machines to perform a certain function or group of functions.

Although the figures show a specific order of method steps, the order of the steps may differ from what is depicted. Also, two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

What is claimed is:

1. A method for training a surrogate model for predicting system states for a building management system based on generated data from a simulation model, the method comprising:
    calibrating the simulation model for a building of interest, the building of interest comprising building equipment operable to control a variable state of the building;
    generating simulated data of system states using the calibrated simulation model;
    training the surrogate model based on the simulated data from the calibrated simulation model;
    generating system state predictions using the surrogate model;
    re-training the surrogate model based on updated operational data; and
    generating an updated series of system state predictions using the re-trained surrogate model.

2. The method of claim 1, wherein the simulation model is calibrated to fit historic operational data from the operation of the building equipment in an HVAC system.

3. The method of claim 2, wherein the historic operational data from the operation of the building equipment comprises data from less than a month of operation.

4. The method of claim 1, wherein the simulated data of system states comprises heat transfer states and generating the system state predictions comprises generating heat transfer state predictions.

5. The method of claim 4, further comprising changing operation of the building equipment to modify energy consumption of the building of interest using the updated series of system state predictions.

6. The method of claim 1, wherein the surrogate model comprises a deep neural network model.

7. The method of claim 6, wherein the deep neural network model is a long-short term memory model.

8. The method of claim 1, wherein the method further comprises receiving a predetermined amount of updated operational data from operation of the building equipment and beginning to re-train the surrogate model in response to receiving the predetermined amount of updated operational data.

9. The method of claim 8, wherein the method further comprises continuing to re-train the surrogate model as updated operational data is received.

10. The method of claim 1, wherein the method further comprises controlling the building equipment based on the updated series of system state predictions.

11. The method of claim 1, wherein the simulation model generates the simulated data by receiving as input one or more of outside air temperature data, outside humidity data, 3D geometry of the building, HVAC system data, building operating strategies, building operating schedules, or simulation specific parameters for the building of interest.

12. The method of claim 11, wherein the inputs to the simulation model are generated by a building simulation engine, wherein the simulation receives an Intermediate Data Format file from the building simulation engine comprising 3D building modeling and historic operational data of building equipment in an HVAC system.

13. The method of claim 1, wherein the simulated data of system states comprises one or more of temperature, heat gains, or energy consumption of an HVAC system in the building of interest.

14. The method of claim 1, wherein the system state predictions comprise one or more of a temperature of the building of interest, an air handling unit (AHU) electrical fan power, an AHU heating coil load, or an AHU cooling coil load.

15. A building management system comprising:
one or more processing circuits configured to:
calibrate a simulation model for a building of interest;
generate simulated data of system states using the calibrated simulation model;
train a surrogate model based on the simulated data of system states from the calibrated simulation model;
generate system state predictions using the surrogate model;
re-train the surrogate model based on updated operational data; and
generate an updated series of system state predictions using the re-trained surrogate model.

16. The building management system of claim 15, wherein the simulation model is calibrated to fit historic operational data from operation of building equipment in an HVAC system of the building of interest.

17. The building management system of claim 16, wherein the historic operational data from the operation of building equipment comprises data from less than a month of operation.

18. The building management system of claim 15, wherein the simulated data of system states comprises heat transfer states and generating the system state predictions comprises generating heat transfer state predictions.

19. The building management system of claim 15, the processing circuits further configured to change operation of building equipment to modify energy consumption of the building of interest using the updated series of system state predictions.

20. The building management system of claim 15, the processing circuits further configured to continue re-training the surrogate model as updated operational data is received from the operation of building equipment in the building of interest.

21. One or more non-transitory computer-readable storage media having instructions stored thereon that, when executed by one or more processors, cause the one or more processors to perform operations comprising:
calibrating a simulation model;
generating simulated data of system states using the calibrated simulation model;
training a surrogate model based on the simulated data from the calibrated simulation model;
generating system state predictions using the surrogate model;
re-training the surrogate model based on updated operational data; and
generating an updated series of system state predictions using the re-trained surrogate model.

22. The non-transitory computer-readable storage media of claim 21, wherein the simulation model is calibrated to fit historic operational data from operation of building equipment in an HVAC system of a building.

23. The non-transitory computer-readable storage media of claim 22, the operations further comprising receiving a predetermined amount of updated operational data from operation of the building equipment and beginning to re-train the surrogate model in response to receiving the predetermined amount of updated operational data.

\* \* \* \* \*